US011915314B2

(12) United States Patent
Di Nicola et al.

(10) Patent No.: US 11,915,314 B2
(45) Date of Patent: Feb. 27, 2024

(54) METHOD AND APPARATUS FOR A BLOCKCHAIN-AGNOSTIC SAFE MULTI-SIGNATURE DIGITAL ASSET MANAGEMENT

(71) Applicant: Conio Inc., San Francisco, CA (US)

(72) Inventors: Vincenzo Di Nicola, Bothell, WA (US); Massimiliano Sala, Trento (IT); Alessio Meneghetti, Cittadella (IT); Riccardo Longo, Tesero (IT)

(73) Assignee: Conio Inc., San Francisco, CA (US)

( * ) Notice: Subject to any disclaimer, the term of this patent is extended or adjusted under 35 U.S.C. 154(b) by 216 days.

(21) Appl. No.: 16/951,747

(22) Filed: Nov. 18, 2020

(65) Prior Publication Data

US 2021/0158444 A1 May 27, 2021

Related U.S. Application Data

(60) Provisional application No. 62/939,501, filed on Nov. 22, 2019.

(51) Int. Cl.
*H04L 9/14* (2006.01)
*H04L 9/32* (2006.01)
(Continued)

(52) U.S. Cl.
CPC ......... *G06Q 40/04* (2013.01); *G06Q 20/0655* (2013.01); *G06Q 20/3825* (2013.01);
(Continued)

(58) Field of Classification Search
CPC ............... G06Q 40/04; G06Q 20/0655; G06Q 20/3825; G06Q 20/3829; G06Q 20/401;
(Continued)

(56) References Cited

U.S. PATENT DOCUMENTS 5,265,164 A 11/1993 Matyas et al.
5,485,519 A 1/1996 Weiss
(Continued)

FOREIGN PATENT DOCUMENTS

CN 109934585 A 6/2019
EP 3259724 A1 12/2017
(Continued)

OTHER PUBLICATIONS

"International Search Report" and "Written Opinion of the International Searching Authority," Patent Cooperation Treaty App. No. PCT/US2017/049209, dated Nov. 20, 2017, 11 pages.
(Continued)

*Primary Examiner* — Courtney P Jones
(74) *Attorney, Agent, or Firm* — Carr & Ferrell LLP (57) ABSTRACT

Exemplary embodiments provided herein include a method for safe creation, custody, recovery and management of a digital asset, agnostic to an underlying blockchain technology, the method including establishing a virtual layer where three private keys are generated, transacting the digital asset by using two of three of the private keys and multi-party computation techniques, abstracting interactions between the three private keys from the underlying blockchain technology, having a digital asset transaction considered as a single-signature by the underlying blockchain technology, and recovering the digital asset if any of the three private keys is no longer available. Additionally, the digital asset may be a cryptocurrency, and a party may be disconnected from any network during the normal user operation phases. Furthermore, the digital asset transaction may be considered as a single-signature, as seen by the underlying blockchain technology, and is associated to a public key PK_ABC.

20 Claims, 6 Drawing Sheets

(51) Int. Cl.
*G06Q 20/38* (2012.01)
*G06Q 20/40* (2012.01)
*G06Q 40/04* (2012.01)
*H04L 9/30* (2006.01)
*G06Q 20/06* (2012.01)

(52) U.S. Cl.
CPC ....... *G06Q 20/3829* (2013.01); *G06Q 20/401* (2013.01); *H04L 9/14* (2013.01); *H04L 9/3073* (2013.01); *H04L 9/3247* (2013.01); *G06Q 2220/00* (2013.01); *H04L 2209/46* (2013.01); *H04L 2209/56* (2013.01)

(58) Field of Classification Search
CPC ..... G06Q 2220/00; H04L 9/14; H04L 9/3073; H04L 9/3247; H04L 2209/46; H04L 2209/56
USPC .......................................................... 705/71
See application file for complete search history.

(56) References Cited

U.S. PATENT DOCUMENTS

| | | | |
|---|---|---|---|
| 5,588,061 | A | 12/1996 | Ganesan et al. |
| 5,835,592 | A | 11/1998 | Chang et al. |
| 9,189,777 | B1 | 11/2015 | Dickinson et al. |
| 10,373,129 | B1 | 8/2019 | James et al. |
| 10,511,436 | B1* | 12/2019 | Machani ................. H04L 9/085 |
| 10,547,441 | B2 | 1/2020 | Di Nicola et al. |
| 11,164,182 | B2 | 11/2021 | Di Nicola |
| 2004/0236694 | A1 | 11/2004 | Tattan et al. |
| 2006/0106754 | A1 | 5/2006 | Blumenau et al. |
| 2007/0014399 | A1 | 1/2007 | Scheidt et al. |
| 2007/0143210 | A1 | 6/2007 | Yeung et al. |
| 2008/0075288 | A1 | 3/2008 | Kamijoh et al. |
| 2008/0162935 | A1 | 7/2008 | Ginzboorg et al. |
| 2009/0144557 | A1 | 6/2009 | Sutton |
| 2010/0088521 | A1 | 4/2010 | Koplow |
| 2010/0111308 | A1 | 5/2010 | Forsberg et al. |
| 2013/0124870 | A1 | 5/2013 | Rosati et al. |
| 2013/0159732 | A1 | 6/2013 | Leoutsarakos |
| 2013/0198519 | A1 | 8/2013 | Marien et al. |
| 2013/0203384 | A1 | 8/2013 | Narasimhan et al. |
| 2014/0380036 | A1 | 12/2014 | Neumann |
| 2015/0170112 | A1 | 6/2015 | Decastro |
| 2015/0262171 | A1 | 9/2015 | Langschaedel et al. |
| 2015/0348017 | A1 | 12/2015 | Allmen |
| 2016/0127336 | A1 | 5/2016 | Cignetti et al. |
| 2016/0344543 | A1 | 11/2016 | Alness |
| 2018/0069697 | A1 | 3/2018 | Di Nicola et al. |
| 2018/0109377 | A1 | 4/2018 | Fu |
| 2018/0234251 | A1* | 8/2018 | Oberheide ............. G06F 21/40 |
| 2018/0278594 | A1* | 9/2018 | Schiffman ............. H04L 9/3255 |
| 2018/0293557 | A1 | 10/2018 | Kim et al. |
| 2018/0367316 | A1 | 12/2018 | Cheng et al. |
| 2019/0007205 | A1* | 1/2019 | Corduan ................ H04L 63/062 |
| 2019/0220859 | A1 | 7/2019 | Weight et al. |
| 2019/0327085 | A1 | 10/2019 | Patel |
| 2019/0354972 | A1 | 11/2019 | Di Nicola |
| 2020/0044863 | A1* | 2/2020 | Yadlin ..................... H04L 9/085 |
| 2020/0127835 | A1* | 4/2020 | Fletcher .................. H04L 9/085 |
| 2020/0374113 | A1* | 11/2020 | Noam ..................... G06F 21/64 |
| 2021/0036841 | A1* | 2/2021 | Craige .................. H04L 9/3252 |
| 2021/0042829 | A1* | 2/2021 | Wright ............... G06Q 20/3825 |
| 2021/0083882 | A1* | 3/2021 | Venable, Sr. ......... H04L 9/3268 |
| 2021/0160082 | A1* | 5/2021 | Wang .................. G06Q 20/3823 |
| 2022/0021521 | A1* | 1/2022 | Shamai ................. H04L 9/0869 |

FOREIGN PATENT DOCUMENTS

| | | |
|---|---|---|
| EP | 3507701 A1 | 7/2019 |
| EP | 3794536 A1 | 3/2021 |
| WO | WO2016077121 A1 | 5/2016 |
| WO | WO2017145016 A1 | 8/2017 |
| WO | WO2018044946 A1 | 3/2018 |
| WO | WO2018229608 A1 | 12/2018 |
| WO | WO2019221956 A1 | 11/2019 |
| WO | WO2021102041 A1 | 5/2021 |

OTHER PUBLICATIONS

Dwyer, Gerald P., "The Economics of Bitcoin and Similar Private Digital Currencies," 2014 [retrieved on Oct. 19, 2017], Retrieved from the Internet: <URL:http://mpra.ub.unii-muenchen.de/57360/3/MPRA_paper_57360.pdf>, 31 pages.

"International Search Report" and "Written Opinion of the International Searching Authority," Patent Cooperation Treaty App. No. PCT/US2019/030900, dated Jul. 17, 2019, 7 pages.

"Extended European Search Report" and "Written Opinion", European Application No. 17847407.8, dated Feb. 25, 2020, 8 pages.

"International Search Report" and "Written Opinion of the International Searching Authority," Patent Cooperation Treaty App. No. PCT/US2020/061111, dated Mar. 23, 2021, 9 pages.

Bekshe, M. "Multi-Sig vs MPC: Which is more secure?" Official BitGo Blog, XP093098541, Retrieved from the Internet: <URL:https://blog.bitgo.com/multi-sig-vs-mpc-which-is-more-secure-699ecefc8430>, [retrieved on Nov. 6, 2023], Sep. 11, 2019, 11 pages.

Spatium, "Secure multi-party computation vs Multisignature." Medium.com, XP093098540, Retrieved from the Internet: <URL:https://medium.com/@spatium_news/secur e-multi-party-computation-vs-multisignature-elb632db4ec6>, [retrieved on Nov. 6, 2023], Nov. 5, 2019, pp. 1-10,.

* cited by examiner

METHOD AND APPARATUS FOR A BLOCKCHAIN-AGNOSTIC SAFE MULTI-SIGNATURE DIGITAL ASSET MANAGEMENT

CROSS-REFERENCE TO RELATED APPLICATIONS

The present application claims the priority benefit of U.S. Provisional Patent Application Ser. No. 62/939,501 filed on Nov. 22, 2019 titled "Method and Apparatus for a Blockchain-Agnostic Safe Multi-Signature Digital Asset Management," which is hereby incorporated by reference in its entirety.

FIELD OF INVENTION

The present technology pertains to a method and apparatus for digital asset management independent of the type of blockchain employed.

SUMMARY OF EXEMPLARY EMBODIMENTS

The exemplary embodiments provided herein include a method for safe creation, custody, recovery and management of a digital asset, agnostic to an underlying blockchain technology, the method including establishing a virtual layer where three private keys are generated, transacting the digital asset by using two of three of the private keys and multi-party computation techniques, abstracting interactions between the three private keys from the underlying blockchain technology, having a digital asset transaction considered as a single-signature by the underlying blockchain technology, and recovering the digital asset if any of the three private keys is no longer available. Additionally, the digital asset may be a cryptocurrency, and a party may be disconnected from any network during the normal user operation phases.

The digital asset transaction, according to various exemplary embodiments, may be considered as a single-signature, as seen by the underlying blockchain technology, and associated to a public key PK_ABC that is created and used to verify the transaction. Additionally, the digital asset may be transacted and recovered through derived keys.

In further exemplary embodiments, a first party [B] may generate a private and public information pair (sk_B; pk_B) and transmit the public information (pk_B) to a second party [A]. The first party [B] may keep the private information sk_B secret and never reveal it. A third party [C] may initiate communication with the second party [A] and transmit the public information pk_B to the third party [C] and the second party [A] may generate a secret s_A and two shards $\sigma\_AB$ and $\sigma\_AC$. Additionally, the third party [C] may generate a secret s_C and two shards $\sigma\_CA$ and $\sigma\_CB$, the second party [A] may generate a shard $\sigma\_BA$, and the third party [C] may generate a shard $\sigma\_BC$. The second party [A] may encrypt shard $\sigma\_AB$ and shard $\sigma\_BA$ with the public information pk_B, getting rec_AB, and the third party [C] may encrypt shard $\sigma\_CB$ and shard $\sigma\_BC$ with the public information pk_B, getting rec_CB.

Additionally, the second party [A], according to many exemplary embodiments, may send ($\sigma\_AC$; rec_AB) to the third party [C] and the third party [C] may send ($\sigma\_CA$; rec_CB) to the second party [A]. The second party [A] may compute the private key SK_A, generated by using s_A, $\sigma\_BA$ and $\sigma\_CA$, and the third party [C] may compute the private key SK_C, by using s_C, $\sigma\_BC$ and $\sigma\_AC$. By combining a signature of private keys (SK_A, SK_C) a digital asset may be transacted. Furthermore, the second party [A] and the third party [C] may compute a public key PK_ABC. The public key PK_ABC may be communicated to a blockchain underneath the virtual layer, and the blockchain underneath the virtual layer may use the public key PK_ABC to verify that a signature is valid. In various exemplary embodiments, the signature may be created on the virtual layer by multiple private keys and the blockchain underneath the virtual layer may have access only to the public key PK_ABC and the signature. The blockchain underneath the virtual layer may not have access to the multiple private keys on the virtual layer. Additionally, the second party [A] and the third party [C] may sign a transaction by using the private keys SK_A and SK_C and multi-party computation techniques.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF EXEMPLARY EMBODIMENTS

While the present technology is susceptible of embodiment in many different forms, there are shown in the drawings and will herein be described in detail several specific embodiments with the understanding that the present disclosure is to be considered as an exemplification of the principles of the present technology and is not intended to limit the technology to the embodiments illustrated.

Digital assets (for example, cryptocurrencies such as Bitcoin, or tokens created with certain blockchains) are at their core defined by a single Public Key and Private Key pair. A digital asset transaction (for example, a digital asset transfer) is digitally signed with the original owner's Private Key, and any external observer can verify it by using the corresponding Public Key.

A Public Key can be communicated to the whole world, while the Private Key must be kept private by the owner. If the Private Key is lost, the owner can no longer access their digital asset. If the Private Key is given to or copied by someone else, that someone else can transact the digital asset, effectively stealing it from the owner.

In order to prevent this, a number of approaches have been suggested to safeguard the Private Key. For example, divide the Private Key in multiple parts, make multiple copies of each part, and store them in different secure places. Such approaches are manual, require a "ceremony" with the physical presence of several operators in the same place, and the loss of a part of the Private Key may still result in the total loss of the Private Key.

Other approaches rely on multiple Private Keys, preferably handled by different entities, where a minimum number of different Private Key signatures are needed to create a digital asset transaction. Such approaches are specific to each different underlying blockchain technology (e.g., a multi-signature scheme on the Bitcoin blockchain is different from a multi-signature scheme on the Ethereum blockchain). In addition, some blockchains may not even allow a multi-signature scheme, and are simply limited to a single-signature scheme.

Figure 1:
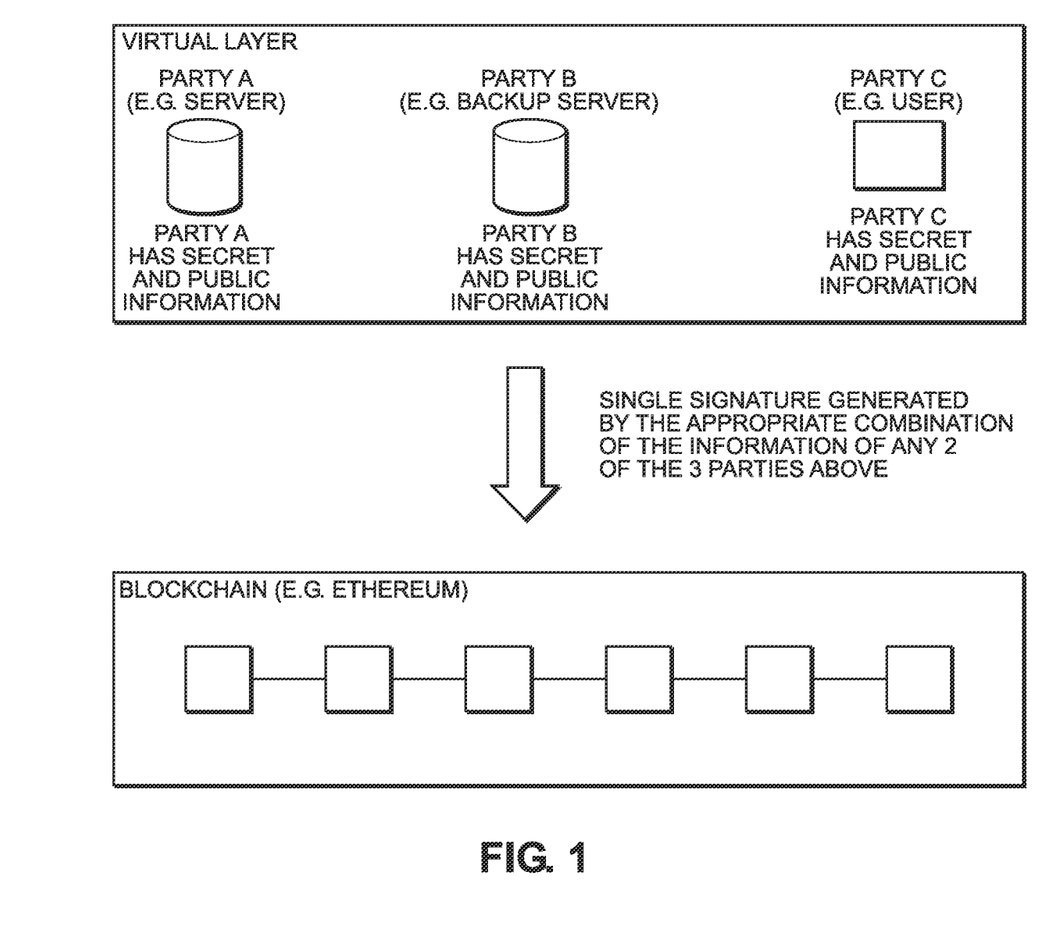
FIG. 1 illustrates the various exemplary embodiments described herein that allow for a blockchain-agnostic safe multi-signature digital asset management.

FIG. 1 illustrates the various exemplary embodiments described herein that allow for blockchain-agnostic safe multi-signature digital asset management.

Shown in FIG. 1 are a virtual layer and an underlying blockchain. Included in the virtual layer is Party A, for example, a server including one or more hardware processors executing instructions stored in a non-transitory computer-readable medium. Party A has secret and public information. Also shown is Party B, for example, a backup server including one or more hardware processors executing instructions stored in a non-transitory computer-readable medium. Party B has secret and public information. Party C, for example, a user, is shown. Party C has secret and public information. Party C may also have a server including one or more hardware processors executing instructions stored in a non-transitory computer-readable medium, or a smartphone or other personal computing device. A single-signature is generated by the appropriate combination of the information of any two of the three parties.

The exemplary embodiments herein do not need the underlying blockchain to support multi-signature schemes. They effectively create a virtual layer, where parties deal with a multi-signature scheme and the underlying blockchain deals with a single-signature scheme. As a bonus result, since the digital asset transactions are effectively single-signature on the blockchain, their size and cost are smaller than the approaches mentioned earlier.

According to various exemplary embodiments, they do not even need anyone to know what the Private Key related to the single-signature is (such a Private Key may not even be created at all), and it still allows transactions of the digital asset. Nor do all of the parties need to be online at the same time. One of the parties may even be disconnected from any network, and it still allows transactions of the digital asset.

In many exemplary embodiments, by applying the correct recovery methods, they effectively prevent the loss or theft of digital assets and also allow solving special real-life situations like the transfer of a digital asset to an heir.

The various exemplary embodiments described herein are still able to enhance privacy by preventing the so-called address reusing: on the virtual layer, they properly derive the parties' Private Keys and, on the underlying single-signature blockchain, for each derivation, a different Public Key (address) is generated.

According to various exemplary embodiments, there are three parties and four phases.

Parties:

A: a server, always online. In certain embodiments, it is offered by a service provider.

B: a backup server, online only in the preliminary phase and the recovery phase. In certain embodiments, it is offered by a provider different from A (for example, B may be a financial institution). In other embodiments, it may be handled by the user C itself if the user does not want to rely on other providers.

C: the user, online starting from the enrollment phase. In certain embodiments, it is a person who wants digital assets, and may not even be known in the preliminary phase.

Phases:
Preliminary.
Enrollment.
Ordinary Signature.
Recovery Signature.

Communications between parties A, B and C may take place on insecure channels. So standard encryption mechanisms (e.g. HTTPS) are to be used.

The various exemplary embodiments described herein effectively create a virtual layer, where 3 Private Keys exist. They require at least any two Private Keys out of the three ("2-of-3") to create a signature, using proper threshold signature mechanisms. The blockchain underneath the virtual layer sees such a signature as if being signed by a single Private Key, and can verify it with its corresponding Public Key.

The various exemplary embodiments are structured so that all three parties' Private Keys are different from each other. It is also structured so that all three parties need not be online at the same time. Additionally, one party may even cease to exist or not be available at all, and the digital asset can still be transacted or recovered.

Figure 2:
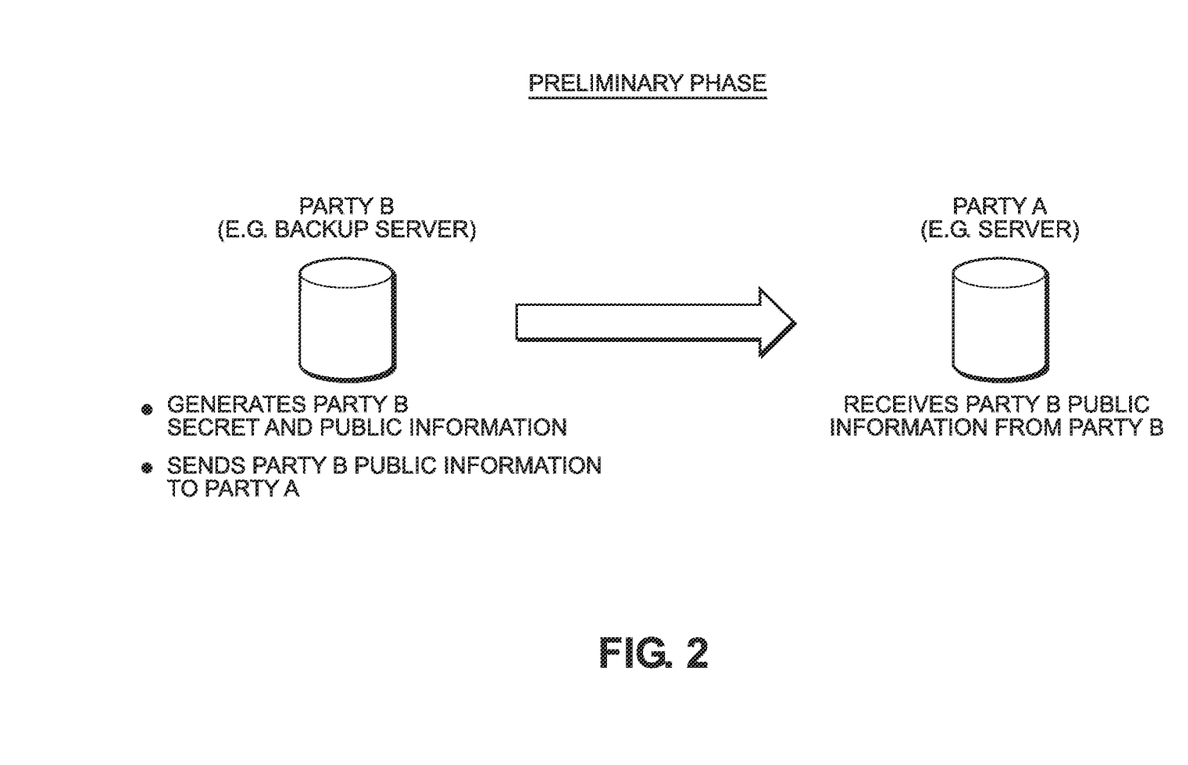
FIG. 2 shows the Preliminary Phase.

FIG. 2 shows the Preliminary Phase.

Shown in FIG. 2 are Party B and Party A. Party B generates Party B's secret and public information. Party B sends Party B's public information to Party A. Party A receives Party B's public information.

As shown in FIG. 2, the process starts with a Preliminary Phase. This phase occurs only once, at the very beginning. The parties involved in this phase are A and B:

B generates a non-ephemeral private/public information pair (sk_B; pk_B).

B sends the public information pk_B to A.

B keeps the private information sk_B secret and never reveals it to the other parties.

Figure 3:
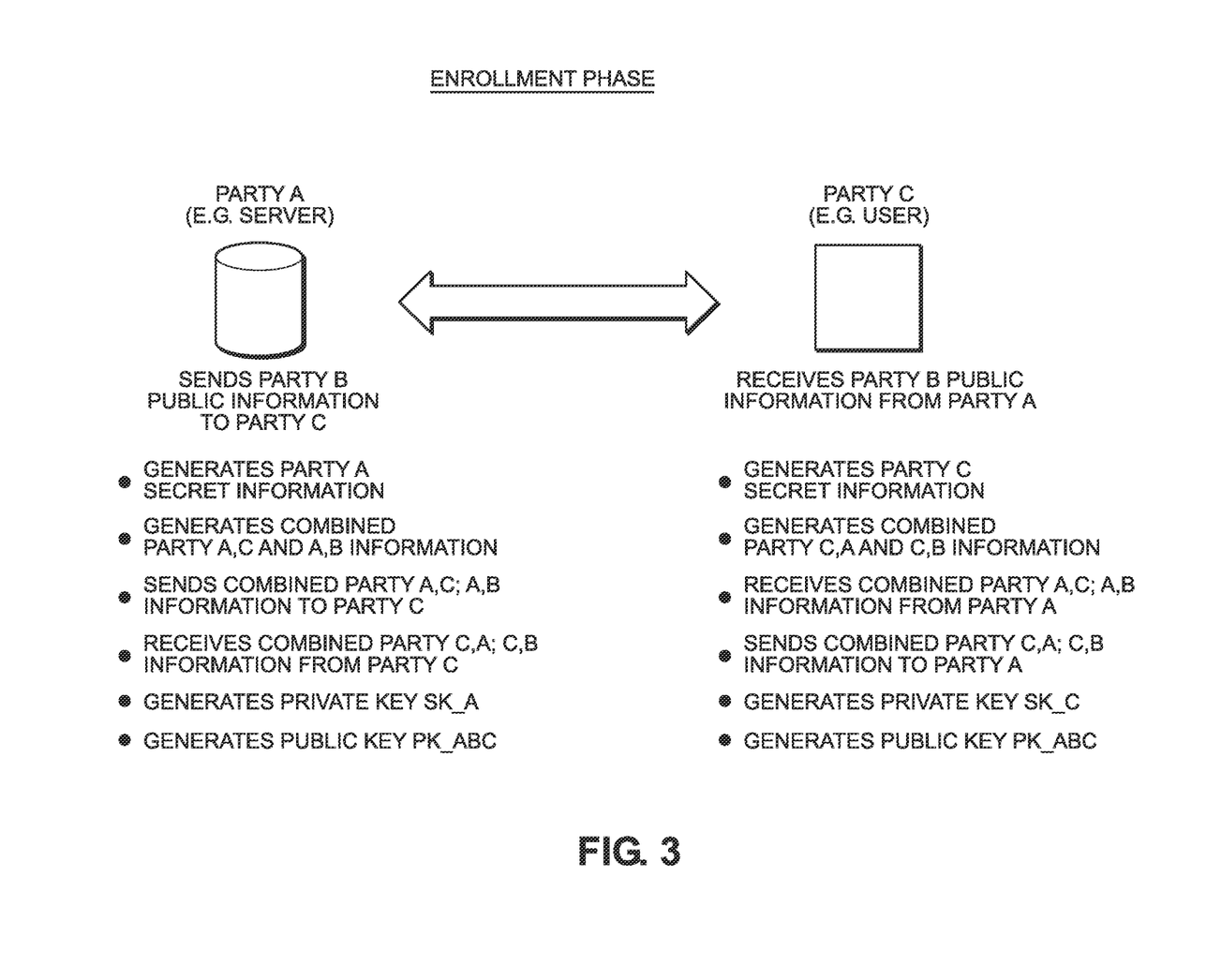
FIG. 3. shows the Enrollment Phase.

FIG. 3. shows the Enrollment Phase.

Shown in FIG. 3 are Party A and Party C. Party A sends Party B's public information to Party C. Party A also generates Party A's secret information, and combined Party A,C and A,B information. Party A sends the combined Party A,C and A,B information to Party C. Party A receives combined Party C,A and C,B information from Party C and generates private key SK_A and public key PK_ABC.

Party C receives Party B's public information from Party A. Party C generates Party C's secret information and combined Party C,A and C,B information. Party C receives combined Party A,C and A,B information from Party A. Party C sends combined Party C,A and C,B information to Party A. Party C also generates private key SK_C and public key PK_ABC.

The enrollment phase occurs whenever C, a new user, wants to deal with digital assets, and so it initiates its communication with A. The parties involved in this phase are A and C:

A sends pk_B to C.

Secrets Generation:

A generates a secret s_A and two shards σ_AB and σ_AC.

C generates a secret s_C and two shards σ_CA and σ_CB.

A generates a shard σ_BA.

C generates a shard σ_BC.

A encrypts σ_AB and σ_BA with the public information pk_B, getting recovery secret "rec"_AB.

C encrypts σ_CB and σ_BC with the public information pk_B, getting rec_CB.

A shard is a piece of data meant to be combined with other shards or secret information to create some data in a multi-party computation protocol.

Shards Communication:

A sends (σ_AC; rec_AB) to C.

C sends (σ_CA; rec_CB) to A.

A and C Private Keys generation:

A computes the Private Key SK_A, generated using s_A, σ_BA and σ_CA.

C computes the Private Key SK_C, generated using s_C, σ_BC and σ_AC.

The combined signature of these two Private Keys (SK_A, SK_C) allows to transact the digital asset ("2-of-3" signature scheme).

Public Key generation: A and C compute the public key PK_ABC. Such Public Key (PK_ABC) is communicated to the world. The blockchain underneath the virtual layer knows it, and may use it to verify that the signature (created on the virtual layer by multiple Private Keys) is valid. As a result, the underlying blockchain sees only a Public Key and a single-signature: it is not aware that this is the result of multiple Private Keys on the virtual layer.

Common secret generation: A and C compute a common secret d, based on the shards σ_BA and σ_BC, that can be used to derive other keys without performing another enrollment.

It is worth noting that both A and C have the pair of encrypted recovery secrets (rec_AB; rec_CB), but none of them has the corresponding plaintext content in full: the only party who is able to fully decrypt (rec_AB; rec_CB) is B.

It is also worth noting that Private Key SK_ABC is not created and may never be created at all in any phase.

Figure 4:
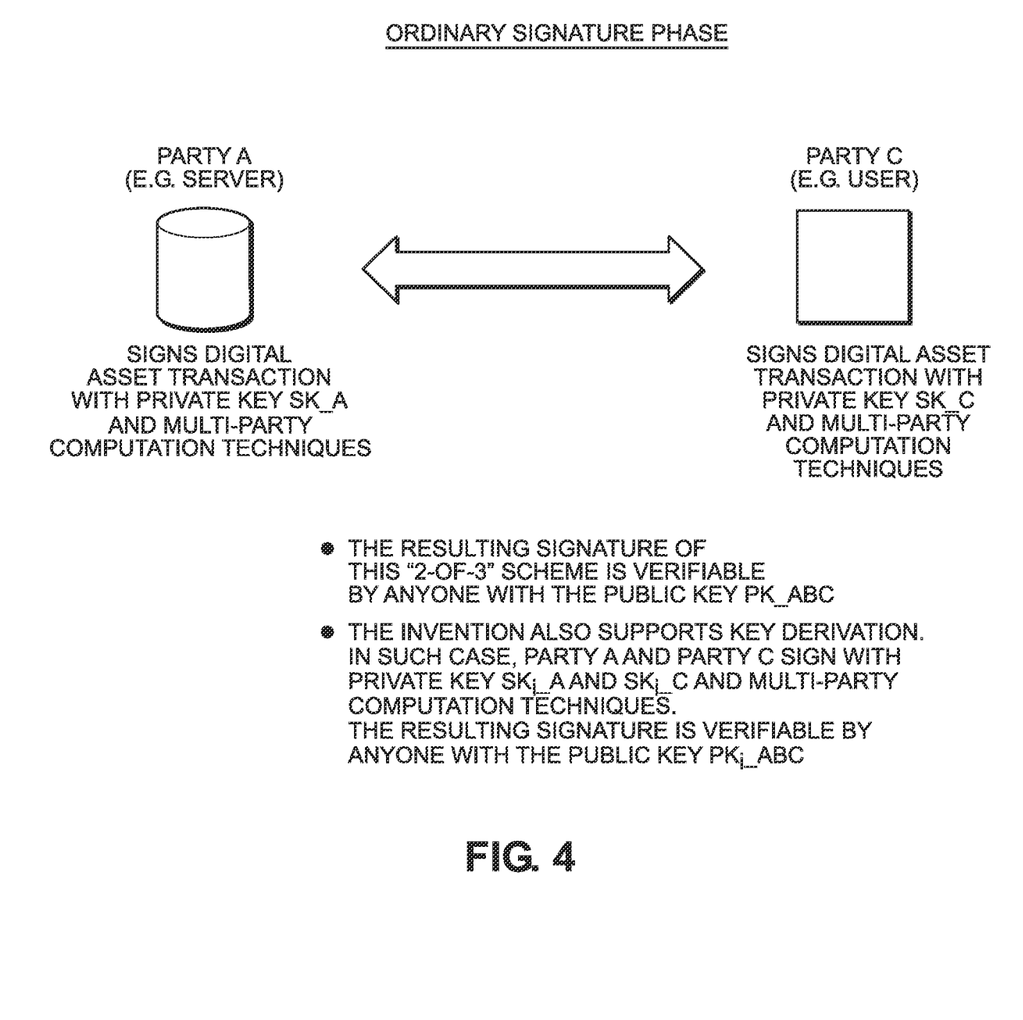
FIG. 4. shows the Ordinary Signature Phase.

FIG. 4. shows the Ordinary Signature Phase.

Shown in FIG. 4 are Party C and Party A. Party C signs a digital asset transaction with private key SK_C and multi-party computation techniques. Secure multi-party computation (also known as secure computation, multi-party computation (MPC), or privacy-preserving computation) is a subfield of cryptography with the goal of creating methods for parties to jointly compute a function over their inputs while keeping those inputs private. Unlike traditional cryptographic tasks, where cryptography assures security and integrity of communication or storage and the adversary is outside the system of participants (an eavesdropper on the sender and receiver), the cryptography in this model protects participants' privacy from each other.

Also shown in FIG. 4, Party A signs a digital asset transaction with private key SK_A and multi-party computation techniques. The resulting signature of this "2-of-3" scheme is verifiable by anyone with the public key PK_ABC. This also supports key derivation. In such a case, Party A and Party C sign with private keys $SK_i$ A and $SK_i$ C and multi-party computation techniques. The resulting signature is verifiable by anyone with the public key $PK_i$ $ABC_i$.

As shown in FIG. 4, the Ordinary Signature Phase occurs whenever C, an existing user, wants to sign a digital asset transaction. The parties involved in this phase are A and C:

A and C sign the transaction by using the Private Keys SK_A and SK_C and multi-party computation techniques. The signature is verifiable by anyone with the public key PK_ABC.

In this phase, exemplary embodiments are also able to support "Key Derivation." That is, the Private Keys SK_A and SK_C obtained in the Enrollment Phase can be utilized directly to sign messages and transactions, or they can be used to derive deterministically other key pairs. For example, in Bitcoin it is good practice to always use new addresses that correspond to different keys (as seen in BIP32).

Various exemplary embodiments use their own way to derive keys: it is sufficient that A and C agree on a (public) derivation index i; then, using the common secret d computed during the Enrollment phase, they can independently derive the keys $SK_i$ A and $SK_i$ C, and use them in the Signature phase in place of SK_A and SK_C, respectively. Note that the derived Private Keys correspond to a new Public Key $PK_i$ ABC. The derivation can also be compounded: that is, more keys can be derived from a derived key.

Figure 5:
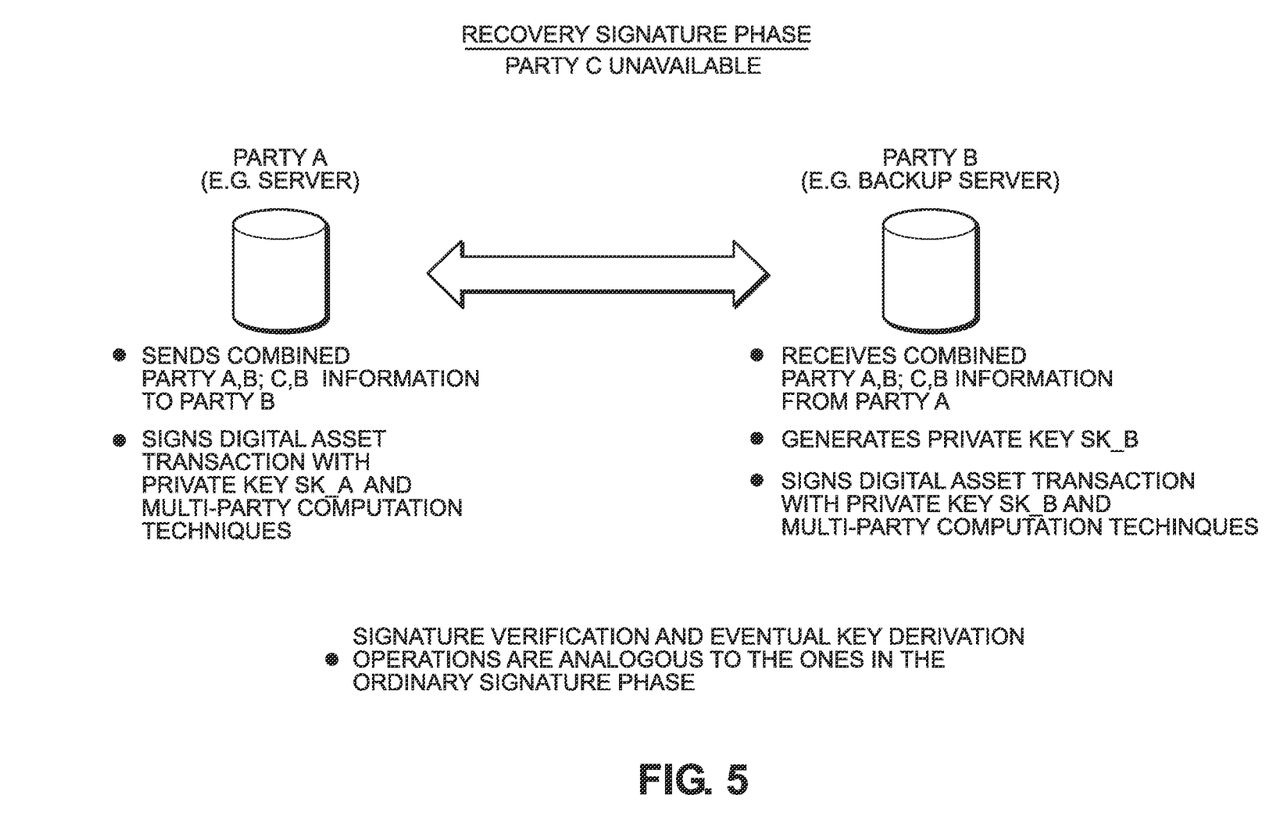
FIG. 5. shows the Recovery Signature Phase where C is unable to sign.

FIG. 5. shows the Recovery Signature Phase where C is unable to sign.

Shown in FIG. 5 are Party A and Party B. Party A sends combined Party A,B and C,B information to Party B. Party A also signs a digital asset transaction with private key SK_A and multi-party computation techniques. Party B receives the combined Party A,B and C,B information from Party A, generates private key SK_B and signs a digital asset transaction with private key SK_B and multi-party computation techniques. Signature verification and eventual key derivation operations are analogous to the ones in the Ordinary Signature Phase.

As shown in FIG. 5, certain exemplary embodiments comprise a Recovery Signature phase. This phase occurs whenever A or C can no longer sign a transaction, e.g. because one of them has lost their secret key material. As a result, the solution is able to recover a digital asset even if one of the parties is no longer available. If C is unable to sign, then the actors involved in this phase are A and B:

Communication:

A contacts B, which comes back online to join the Recovery Signature phase.

A sends (rec_AB; rec_CB) to B.

B Private Key creation:

B decrypts rec_AB and rec_CB using the secret key sk_B, getting (σ_AB; σ_BA; σ_CB; σ_BC).

B generates the secret s_B by using σ_BA and σ_BC. B generates the Private Key SK_B by using s_B, σ_AB and σ_CB. This key is compatible with the "2-of-3" multi-signature scheme.

B computes the common secret d using σ_BA and σ_BC.

A and B sign the transaction using the Private Keys SK_A and SK_B respectively (or the derived keys $SK_i$ A and $SK_i$ B, computed using the common secret d and a derivation index i on which they agreed), using computation techniques analogous to the ones used in in the Ordinary Signature phase. This signature is verifiable by anyone with the public key PK_ABC (or the derived $PK_i$ ABC).

The digital asset is transferred to a new digital wallet.

Figure 6:
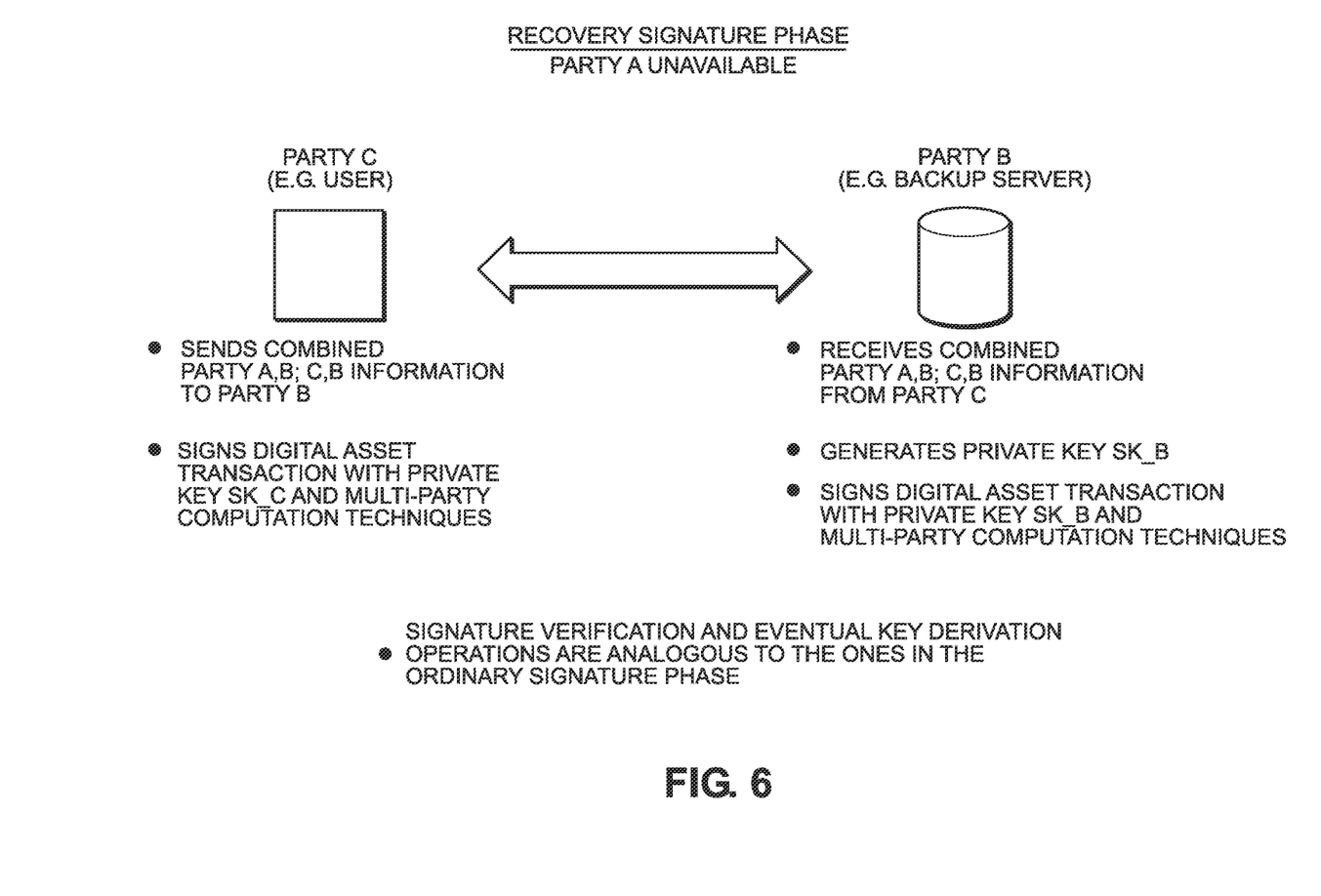
FIG. 6. shows the Recovery Signature Phase where A is unable to sign.

FIG. 6. shows the Recovery Signature Phase where A is unable to sign.

Shown in FIG. 6 are Party C and Party B. Party C sends combined Party A,B and C,B information to Party B. Party C also signs a digital transaction with private key SK_C and multi-party computation techniques. Party B receives combined Party A,B and C,B information from Party C. Party B generates private key SK_B and signs a digital transaction with private key SK_B and multi-party computation techniques. Signature verification and eventual key derivation operations are analogous to the ones in the Ordinary Signature Phase.

As shown in FIG. 6, if A is unable to sign, then the actors involved in this phase are B and C:

Communication:

C contacts B, which comes back online to join the Recovery Signature phase.

C sends (rec_AB; rec_CB) to B.

B Private Key creation:

B decrypts rec_AB and rec_CB using the secret key sk_B, getting ($\sigma$_AB; $\sigma$_BA; $\sigma$_BC; $\sigma$_CB).

B generates the secret s_B by using $\sigma$_BA and $\sigma$_BC.

B generates the Private Key SK_B by using s_B, $\sigma$_AB and $\sigma$_CB. This key is compatible with the "2-of-3" multi-signature scheme.

B computes the common secret d using $\sigma$_BA and $\sigma$_BC.

C and B sign the transaction using the Private Keys SK_C and SK_B respectively (or the derived keys $SK_i$ C and $SK_i$ B, computed using the common secret d and a derivation index i on which they agreed), using computation techniques analogous to the ones used in in the Ordinary Signature phase. This signature is verifiable by anyone with the public key PK_ABC (or the derived $PK_i$ ABC).

The digital asset is transferred to a new digital wallet.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the present technology to the particular forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A method for safe creation, custody, recovery and management of a digital asset, agnostic to an underlying blockchain technology, the method comprising:
   a preliminary phase, the preliminary phase comprising:
      establishing a virtual layer;
      establishing, by a backup server, a non-ephemeral private-public information pair in the virtual layer; and
      sending public information of the non-ephemeral private-public information pair to a service provider server;
   an enrollment phase in which the backup server is offline, the enrollment phase comprising:
      receiving an enrollment request from a user server at the service provider server;
      sending the public information of the non-ephemeral private-public information pair from the service provider server to the user server; and
      generating, in the virtual layer:
         a first data shard pair comprising a provider-backup shard and a provider-user shard, the first data shard pair corresponding to secret information of the service provider server;
         a second data shard pair comprising a user-provider shard and a user-backup shard, the second data shard pair corresponding to secret information of the user server;
         a backup-provider shard generated on the service provider server;
         a backup-user shard generated on the user server;
         a first private key controlled by the service provider server, the first private key computed from the backup-provider shard and the user-provider shard; and
         a second private key controlled by the user server, the second private key computed from the backup-user shard and the provider-user shard;
   an ordinary signature phase in which the backup server is offline, the ordinary signature phase comprising:
      transacting the digital asset by using the first private key and the second private key and multi-party computation techniques, with no single entity and device directly controlling the digital asset; and
   a recovery signature phase, wherein the first private key or the private second key becomes unavailable, the recovery signature phase comprising:
      bringing the backup server online;
      sending the backup-provider shard and the backup-user shard to the backup server;
      generating, in the virtual layer, a third private key controlled by the backup server, the third private key computed from the backup-provider shard, the backup-user shard, and the private information from the non-ephemeral private-public information pair; and
      recovering the digital asset using either a combination of the first private key and the third private key or of the second private key and the third private key.

2. The method of claim 1, wherein the digital asset is a cryptocurrency.

3. The method of claim 1, further comprising the digital asset transaction considered as a single-signature, as seen by the underlying blockchain technology, being associated to a private key SK_ABC that is never created.

4. The method of claim 1, further comprising the digital asset transaction considered as a single-signature, as seen by the underlying blockchain technology, being associated to a public key PK_ABC that is created and that is used to verify the transaction.

5. The method of claim 1, wherein the service provider server, the backup server, and the user server are operatively connected on insecure channels, the service provider server, the backup server, and the user server using encryption mechanisms for data transfer.

6. The method of claim 1, the ordinary signature phase further comprising abstracting interactions between the first private key and the second private key from the underlying blockchain technology, and further having the digital asset transaction considered as a single signature by the underlying blockchain technology, the single signature being generated by combining the first private key and the second private key.

7. The method of claim 1, the recovery signature phase further comprising abstracting interactions between either a combination of the first private key and the third private key or the second private key and the third private key from the underlying blockchain technology, and further having the digital asset transaction considered as a single signature by the underlying blockchain technology, the single signature being generated by the combination of either the first private key and the third private key or the second private key and the third private key.

8. The method of claim 1, the recovery signature phase further comprising transferring the digital asset to a new digital wallet.

9. A system for safe creation, custody, recovery and management of a digital asset, agnostic to an underlying blockchain technology, the system comprising:
 a backup server operatively coupled to a virtual layer;
 a service provider server operatively coupled to the virtual layer;
 a user server operatively coupled to the virtual layer; and
 at least one processor and computer-executable program instructions which, when executed by the at least one processor, perform steps comprising:
 a preliminary phase, the preliminary phase comprising:
  establishing the virtual layer;
  establishing, by the backup server, a non-ephemeral private-public information pair in the virtual layer; and
  sending public information of the non-ephemeral private-public information pair to the service provider server;
 an enrollment phase in which the backup server is offline, the enrollment phase comprising:
  receiving an enrollment request from the user server at the service provider server;
  sending the public information of the non-ephemeral private-public information pair from the service provider server to the user server; and
  generating, in the virtual layer:
   a first data shard pair comprising a provider-backup shard and a provider-user shard, the first data shard pair corresponding to secret information of the service provider server;
   a second data shard pair comprising a user-provider shard and a user-backup shard, the second data shard pair corresponding to secret information of the user server;
   a backup-provider shard generated on the service provider server;
   a backup-user shard generated on the user server;
   a first private key controlled by the service provider server, the first private key computed from the backup-provider shard and the user-provider shard; and
   a second private key controlled by the user server, the second private key computed from the backup-user shard and the provider-user shard;
 an ordinary signature phase in which the backup server is offline, the ordinary signature phase comprising:
  transacting the digital asset by using the first private key and the second private key and multi-party computation techniques, with no single entity and device directly controlling the digital asset; and
 a recovery signature phase, wherein the first private key or the second private key becomes unavailable, the recovery signature phase comprising:
  bringing the backup server online;
  sending the backup-provider shard and the backup-user shard to the backup server;
  generating, in the virtual layer, a third private key controlled by the backup server, the third private key computed from the backup-provider shard, the backup-user shard, and the private information from the non-ephemeral private-public information pair; and
  recovering the digital asset using either a combination of the first private key and the third private key or of the second private key and the third private key.

10. The system of claim 9, wherein the service provider server, the backup server, and the user server are operatively connected on insecure channels, the service provider server, the backup server, and the user server using encryption mechanisms for data transfer.

11. The system of claim 9, wherein the digital asset is a cryptocurrency.

12. The system of claim 9, the steps further comprising the digital asset transaction considered as a single-signature, as seen by the underlying blockchain technology, being associated to a private key SK_ABC that is never created.

13. The system of claim 9, the steps further comprising the digital asset transaction considered as a single-signature, as seen by the underlying blockchain technology, being associated to a public key PK_ABC that is created and that is used to verify the transaction.

14. The system of claim 9, the ordinary signature phase further comprising abstracting interactions between the first private key and the second private key from the underlying blockchain technology, and further having the digital asset transaction considered as a single signature by the underlying blockchain technology, the single signature being generated by combining the first private key and the second private key.

15. The system of claim 9, the recovery signature phase further comprising abstracting interactions between either a combination of the first private key and the third private key or the second private key and the third private key from the underlying blockchain technology, and further having the digital asset transaction considered as a single signature by the underlying blockchain technology, the single signature being generated by the combination of either the first private key and the third private key or the second private key and the third private key.

16. A non-transitory processor-readable medium having instructions stored thereon which when executed by one or more processors, cause the one or more processors to implement a method for safe creation, custody, recovery and management of a digital asset, agnostic to an underlying blockchain technology, the method comprising:
 a preliminary phase, the preliminary phase comprising:
  establishing a virtual layer;
  establishing, by a backup server, a non-ephemeral private-public information pair in the virtual layer; and
  sending public information of the non-ephemeral private-public information pair to a service provider server;
 an enrollment phase in which the backup server is offline, the enrollment phase comprising:
  receiving an enrollment request from a user server at the service provider server;

sending the public information of the non-ephemeral private-public information pair from the service provider server to the user server; and generating, in the virtual layer:
- a first data shard pair comprising a provider-backup shard and a provider-user shard, the first data shard pair corresponding to secret information of the service provider server;
- a second data shard pair comprising a user-provider shard and a user-backup shard, the second data shard pair corresponding to secret information of the user server;
- a backup-provider shard generated on the service provider server;
- a backup-user shard generated on the user server;
- a first private key controlled by the service provider server, the first private key computed from the backup-provider shard and the user-provider shard; and
- a second private key controlled by the user server, the second private key computed from the backup-user shard and the provider-user shard;

an ordinary signature phase in which the backup server is offline, the ordinary signature phase comprising:
- transacting the digital asset by using the first private key and the second private key and multi-party computation techniques, with no single entity and device directly controlling the digital asset; and a recovery signature phase, wherein the first private key or the second private key becomes unavailable, the recovery signature phase comprising:
- bringing the backup server online;
- sending the backup-provider shard and the backup-user shard to the backup server;
- generating, in the virtual layer, a third private key controlled by the backup server, the third private key computed from the backup-provider shard, the backup-user shard, and the private information from the non-ephemeral private-public information pair; and
- recovering the digital asset using either a combination of the first private key and the third private key or of the second private key and the third private key.

17. The non-transitory processor-readable medium of claim 16, wherein the digital asset is a cryptocurrency.

18. The non-transitory processor-readable medium of claim 16, wherein the service provider server, the backup server, and the user server are operatively connected on insecure channels, the service provider server, the backup server, and the user server using encryption mechanisms for data transfer.

19. The non-transitory processor-readable medium of claim 16, the ordinary signature phase further comprising abstracting interactions between the first private key and the second private key from the underlying blockchain technology, and further having the digital asset transaction considered as a single signature by the underlying blockchain technology, the single signature being generated by combining the first private key and the second private key.

20. The non-transitory processor-readable medium of claim 16, the recovery signature phase further comprising abstracting interactions between either a combination of the first private key and the third private key or the second private key and the third private key from the underlying blockchain technology, and further having the digital asset transaction considered as a single signature by the underlying blockchain technology, the single signature being generated by the combination of either the first private key and the third private key or the second private key and the third private key.

* * * * *

UNITED STATES PATENT AND TRADEMARK OFFICE
CERTIFICATE OF CORRECTION

| | |
|---|---|
| PATENT NO. | : 11,915,314 B2 |
| APPLICATION NO. | : 16/951747 |
| DATED | : February 27, 2024 |
| INVENTOR(S) | : Vincenzo Di Nicola et al. |

It is certified that error appears in the above-identified patent and that said Letters Patent is hereby corrected as shown below:

In the Claims

In Column 8, Line 33 (Claim 1):
"the private second key" should read "the second private key".

Signed and Sealed this
Thirtieth Day of April, 2024

Katherine Kelly Vidal
*Director of the United States Patent and Trademark Office*